No. 766,288. PATENTED AUG. 2, 1904.
A. F. RIETZEL.
ELECTRIC WELDING CLAMPING DEVICE.
APPLICATION FILED DEC. 4, 1903.
NO MODEL. 2 SHEETS—SHEET 1.
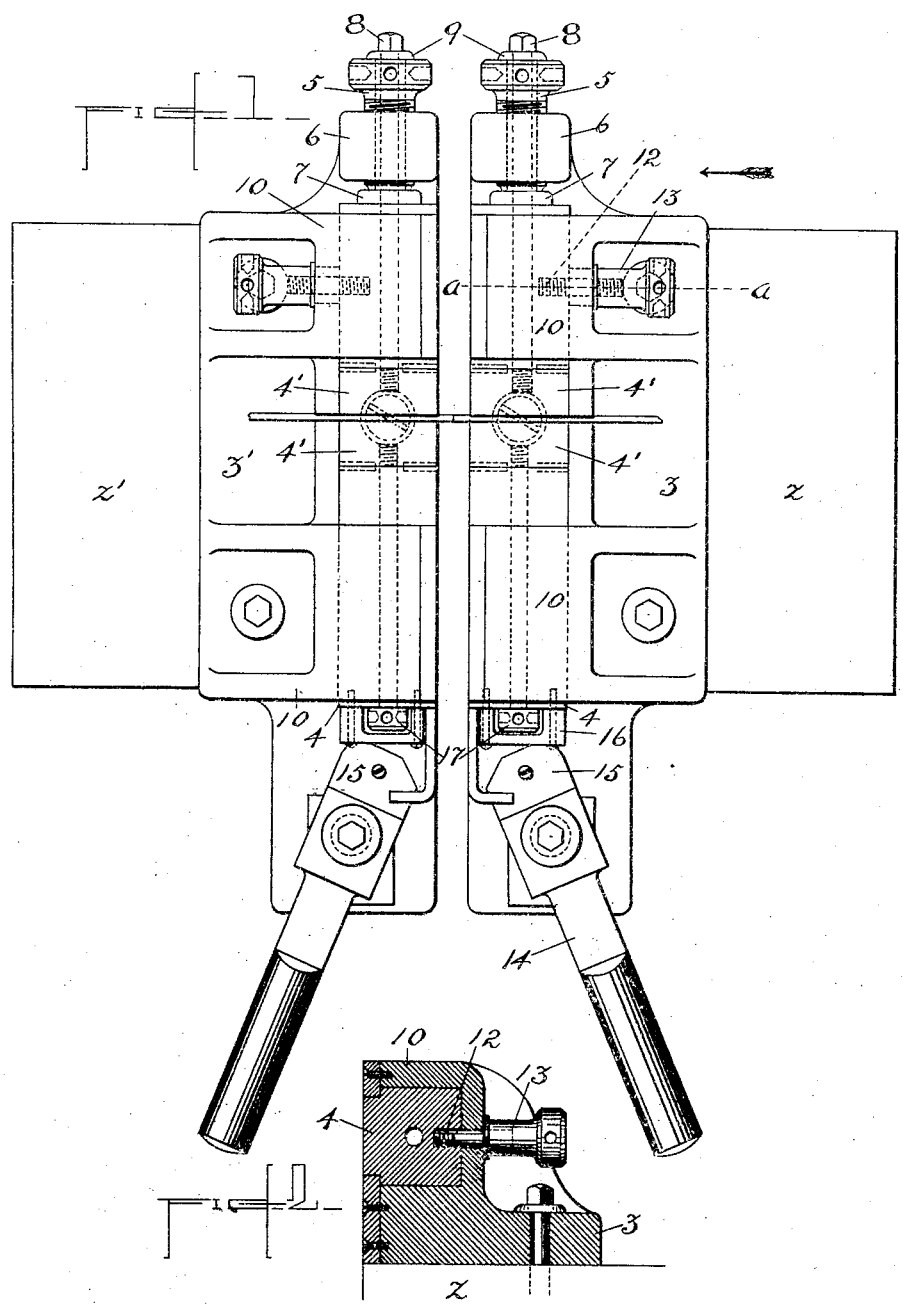
WITNESSES:
INVENTOR
Adolph F. Rietzel
BY
ATTORNEYS

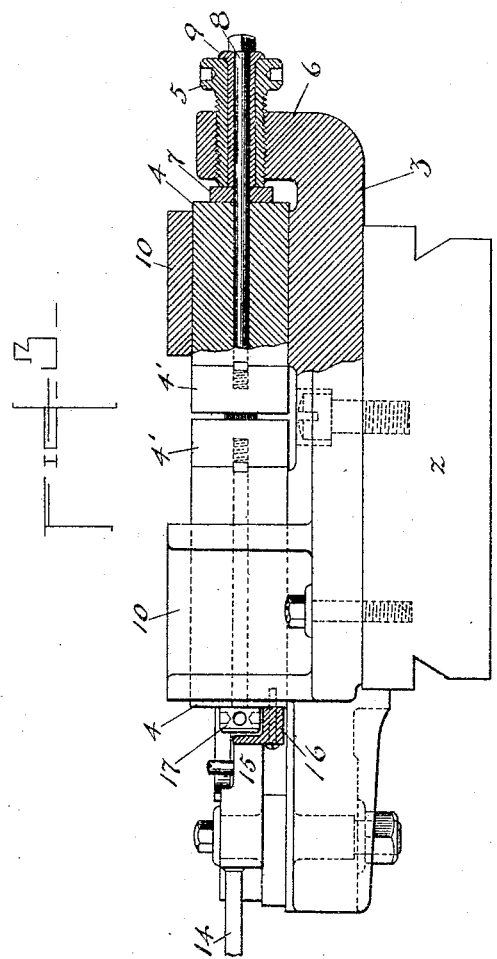

No. 766,288.

Patented August 2, 1904.

UNITED STATES PATENT OFFICE.

ADOLPH F. RIETZEL, OF LYNN, MASSACHUSETTS, ASSIGNOR TO THOMSON ELECTRIC WELDING COMPANY, OF LYNN, MASSACHUSETTS, A CORPORATION OF MAINE.

ELECTRIC-WELDING CLAMPING DEVICE.

SPECIFICATION forming part of Letters Patent No. 766,288, dated August 2, 1904.

Application filed December 4, 1903. Serial No. 183,774. (No model.)

*To all whom it may concern:*

Be it known that I, ADOLPH F. RIETZEL, a citizen of the United States, and a resident of Lynn, in the county of Essex and State of Massachusetts, have invented certain new and useful Improvements in Electric-Welding Clamping Devices, of which the following is a specification.

My invention relates to electric metal-working apparatus—such, for instance, as electric welding or upsetting apparatus—in which the work is held firmly in suitable clamping jaws or devices which apply clamping pressure in a line transverse to the line of pressure upon the heated section of the work.

My invention relates more particularly to the provisions for adjusting one of the clamping-jaws toward the other and for detachably securing the clamping-jaw to the jaw slide or block.

My invention consists, further, in the means for detachably holding the jaw to the jaw-carrying slide or block, which is operated by a cam or other device to bring it into engagement with the work for clamping it or to disengage the work when the operation has been finished.

The main object of my invention is to provide means whereby the clamping-jaw may be readily removed and replaced without disturbing the adjustment of the parts with relation to the opposite clamping-jaw.

A further object of my invention is to secure compactness and cheapness in the construction by so constructing the parts that they may be made of smaller dimensions, thus lessening the cost for material.

A further object is to permit a change of the jaws to be readily made where a variety of work is being done such as to require the use of jaws of different shapes.

My invention consists, first, in the combination, with the jaw-carrying slide or block and a screw for adjusting its position with reference to the opposite jaw, of a detachable jaw-face and a fastening-rod or device passing longitudinally through the adjusting-screw.

My invention consists, further, in the combination, with the jaw slide or block which is operated to clamp or unclamp the work, of a detachable clamping-jaw, a fastening rod or screw passing longitudinally through said jaw-carrying slide or block, and a wear-piece engaged by a cam or other similar clamping device and recessed to receive the head of the said fastening-rod.

My invention consists, further, in details of construction and combinations of parts hereinafter more particularly described and then specified in the claims.

In the accompanying drawings, Figure 1 is a plan of apparatus embodying my invention. Fig. 2 is a cross-section through one of the jaw-carrying slides or blocks and the guide-housing or clamp-body carrying the same on the line *a a*, Fig. 1. Fig. 3 is an end elevation and partial vertical section of the apparatus shown in Fig. 1.

2 2' indicate the usual platens or blocks of an electric metal-working machine, such as an electric welder. Said platens form, as well understood in the art, the terminals of a source of electric current, and one is provided, as usual, with means whereby said platen, together with the clamping device carried by it, may be forced toward the opposite platen carrying its clamping devices. Said clamping devices consist, as usual in the art, of a pair of clamping-jaws, one pair for each platen, and means for supporting and moving one jaw of the pair toward and away from the opposite jaw for the purpose of clamping and freeing the work. In the present instance platen 2 may be considered the movable platen or block movable in the direction of the arrow, Fig. 1, for the purpose of applying pressure to the heated section of work lying between the pairs of clamping-jaws. Said platen while being in connection with one pole of the source of heating current is properly formed or provided with suitable guiding devices to keep the parts in alinement, as well understood in the art.

3 3' indicate the clamp bodies or frames upon which the clamping devices are mounted. In the present instance said clamping devices are the same for both clamp-bodies, and the description of one set of devices—for instance, that carried by the clamp-body 3—will suffice as a description of the other.

4 indicates the clamp slide or block adjustable with its clamp-jaw 4' toward and away from the opposite jaw by means of a suitable adjustment-screw 5, seated in the post 6, forming a part of or secured to the clamp-body 3. The clamp-body 3 itself is suitably fastened down upon the platen 2 and may be, as well understood in the art, adjustable thereon, if desired. The screw 5 engages with wear-plate 7 at the rear of the block 4.

Extending longitudinally through block 4 and passing centrally through screw 5 is a fastening pin or bolt 8, which engages the clamp-jaw 4' and holds it firmly seated against the face of the block 4. The rod 8 preferably passes through a sleeve 9 within the screw 5, and the wear-plate 7 has an opening at its center through which the rod 8 passes, as shown. Preferably the fastening-rod 8 is in the form of a screw whose screw end engages a hole tapped in the block 4'. Suitable means may be provided for preventing the jaw 4' from turning upon the rod when firmly seated against the face of the block 4. The jaw-bearing slide or block 4 is properly seated and guided in a housing or guide 10, formed upon or attached to clamp-body 3, as shown more clearly in Fig. 2. Said housing 10 is opened on the face nearest the work, and the slide or block 4 is held in place by the plates 11 and guided in suitable ways in the housing 10.

It will be seen that by the construction described it is possible to readily detach and replace the clamp-jaw 4' without disturbing in any manner the adjustment of the screw 5.

In coöperation with the adjusting-screw 5 suitable means are employed for fastening the block 4 in its adjusted position. This fastening device may consist of a pin 12, extending rearwardly from the block or slide 4 through an enlarged opening in the back of the housing or guide 10, and a suitable clamp-nut 13 upon the outer end of said pin 12, which serves to draw the slide firmly in a lateral direction against the rear wall of the housing and hold it securely in place. It is obvious that said clamping device might extend through the upper wall of the housing or guide, if desired, although it is preferred to place it in the position shown, where it will be out of the way.

It will be seen that by reason of the presence of the sleeve 9 the screw 5 may be readily manipulated to adjust the position of the jaw without turning or disturbing the fastening-rod 8.

The opposite clamp-jaw may be mounted upon the jaw-bearing block or slide, actuated by any suitable means to permit it to clamp and unclamp the work. The means are shown consisting simply of a lever 14, carrying a cam 15 at its inner end, adapted to engage the face of the wear plate or block of sleeve 16, fastened to the rear end of the clamp-carrying jaw or block. The slide or block operated by the lever 14 may be operated and mounted in the same manner as the one already described. The jaw proper, 4', upon the inner end of said slide is detachably secured thereto by a similar fastening rod or bolt, which passes longitudinally through the block 4 and has its head 17 located in a suitable recess in the wear plate or piece 16. This construction obviously secures compactness and small dimensions of the parts while at the same time rendering the adjustment devices readily accessible and operable without interference with or from the devices which are employed to move the jaw-bearing slide toward the opposite slide or block.

What I claim as my invention is—

1. In an electric metal-working apparatus, the combination with a clamp-bearing jaw or slide and a clamp-jaw detachably secured thereto, of an adjusting-screw for said slide and a fastening-rod for the jaw passing longitudinally through said screw.

2. In an electric metal-working apparatus, the combination with the jaw-carrying slide or block of an adjusting-rod bearing against the end of the same, and a clamp-rod passing through said adjusting-rod and engaging the jaw upon the opposite end of the slide.

3. The combination with the jaw-carrying block or slide and its adjusting-screw, of a jaw detachably fastened to said slide, a fastening-rod passing longitudinally through the screw, and a sleeve interposed between the fastening-rod and adjusting-screw.

4. In an electric metal-working apparatus, the combination with the jaw-carrying slide and a guide or housing therefor, of clamping devices extending rearwardly through said guide or housing and adapted to clamp the slide against the rear wall of the housing, and means for adjusting the block or slide longitudinally in the guide or housing.

5. In an electric metal-working apparatus, the combination with the jaw-carrying block or slide, of a guide or housing in which the same slides, an adjusting-screw for adjusting the position of the jaw borne by said slide with relation to the opposite jaw and means for clamping the slide in the guide or housing.

6. The combination with the jaw-bearing slide 4, and the adjusting-screw therefor, of a guide or housing, a pin extending from the slide through the rear wall of the housing, and a clamp-nut on the end of said pin.

7. In an electric metal-working apparatus, the combination with a jaw-carrying slide or block, of a detachable jaw-face, a fastening rod or bolt therefor extending longitudinally through the block and a recessed wear plate or block for the rear end of the jaw within which the head of the fastening rod or bolt is located.

Signed at Lynn, in the county of Essex and State of Massachusetts, this 10th day of November, A. D. 1903.

ADOLPH F. RIETZEL.

Witnesses:
GEO. W. N. CHADWELL,
E. W. HAWES.